July 6, 1948.  R. H. FAY  2,444,559
CENTERING DEVICE
Filed Feb. 8, 1947

INVENTOR.
Robert H. Fay.
BY Walter C. Ross.
Attorney.

Patented July 6, 1948

2,444,559

UNITED STATES PATENT OFFICE 2,444,559

CENTERING DEVICE

Robert H. Fay, Wilbraham, Mass.

Application February 8, 1947, Serial No. 727,373

2 Claims. (Cl. 51—216)

This invention relates to improvements in centering devices for centering pieces of work.

The principal object of the invention is the provision of a centering device for holding a piece of work on centers for a grinding or other machining operation.

The centering device of the invention is characterized by its simplicity and efficiency and is arranged to include a pair of center members which are held in accurate alignment so that a piece of work held thereby is positioned accurately and may rotate accordingly as required for grinding or machining of the work.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Figure 1:
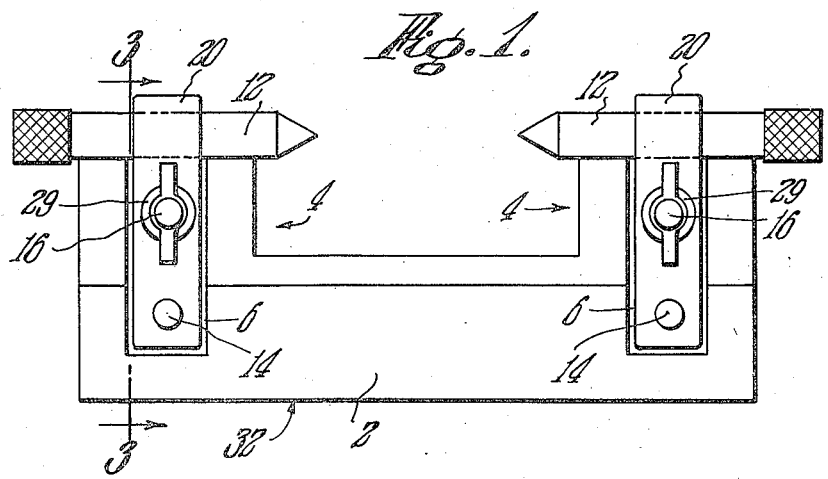
Fig. 1 is a front elevational view of a centering device embodying the novel features of the invention.
Figure 2:
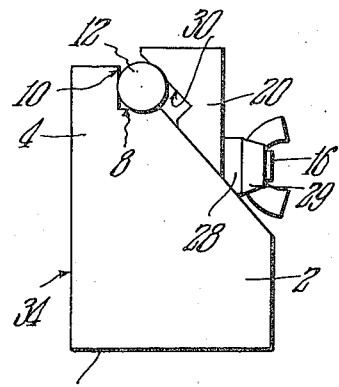
Fig. 2 is a side elevational view of the centering device shown in Fig. 1.
Figure 3:
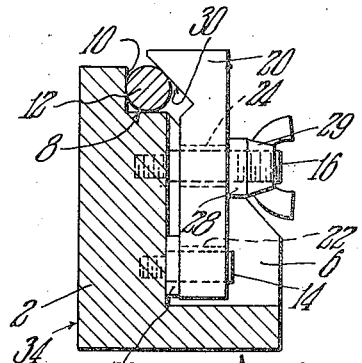
Fig. 3 is a sectional elevational view on the line 3—3 of Fig. 1.

Referring now to the drawings more in detail, the invention will be fully described.

A body 2 is provided which is represented by 2 and it has upwardly extending end portions 4 which are spaced apart longitudinally of the body to provide a space for a work piece. Recesses 6 are provided in each end of the body, as shown.

The end portions 4 are provided with longitudinally extending faces 8 and 10 which are angularly disposed to form seats for center members 12.

Dowels 14 are secured in the lower ends of the recesses 6 and screws 16 are secured in said recesses above the dowels, as shown. These dowels and screws are disposed at right angles relative to the faces 10.

Clamp members 20 have holes 22 and 24 which loosely receive the dowels and screws and washers 26 are disposed on the dowels between the clamp members and bottoms of the recesses. Washers 28 on the screws 16 bear against the clamp members 20 and wing nuts 29 are in threaded engagement with the said screws.

The upper ends of the clamp members 20 have angularly disposed faces 30 for bearing on the center members 12. The center members have inner pointed ends, as shown, for entering the center holes of a piece of work.

The faces 10 and 8 forming the seats at opposite ends of the device are accurately machined so as to be in exact alignment whereby with the center members accurately machined and seated in the seats a piece of work supported by the centers is accurately centered.

The center members are movable longitudinally in the seats when the wing-nuts 29 are loosened so that they may be adjusted to engage a piece of work. The work is supported by the centers and the wing-nuts are tightened so that the clamp members clamp the centers in the seats.

The clamps act to apply pressure to the centers in a direction obliquely to the seat faces so that the centers are gripped on three sides.

The upwardly extending end portions provide a space therebetween, as shown, so that work on the centers may be swung thereon.

Faces 32 and 34 of the body are accurately machined with reference to the faces 8 and 10 forming the center seats so that with the device supported on either of said faces the centerline of the work is in accurate parallelism therewith for accurate machining of the work held by the centers.

The device is adapted for use where it is desired to mount a piece of work on centers so that it may be swung or rotated for measurement, inspection, or other purposes. For instance, a shaft having center holes may be supported by the members 12 disposed in the center holes so that the shaft may be rotated or swung for the purposes of measurement, inspection, and the like.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A work centering device comprising in combination, a body having upwardly extending longitudinally spaced end portions providing a space therebetween for a piece of work, said end portions having adjacent vertical and horizontal longitudinally extending faces forming seats with the corresponding faces of said end portions in alignment, center members for supporting a piece of work movable in said seats and longitudinally thereof, dowels and screws secured to said body, clamp members having holes in lower ends thereof receiving said dowels and holes thereabove receiving said screws, said clamp members having upper faces disposed angularly relative to the faces of said seats for bearing on said center members at sides opposite to the sides engaged by the faces forming said seats, and wing nuts on said screws acting on said clamp members to force the upper faces thereof against said center members.

2. A work centering device comprising in combination, a body having end portions extending upwardly therefrom in longitudinally spaced relation to provide a space for work therebetween, said end portions having adjacent vertical and horizontal faces forming seats for center members with the corresponding faces of said end portions in alignment, dowels extending forwardly from said body at the lower portion thereof at right angles to the vertical faces of the seats, screws extending forwardly from said body spaced above and in parallelism with said dowels, clamp members movable back and forth on said dowels and screws having upper portions adjacent said seats, inner sides of the upper portions of the clamp members having faces disposed angularly relative to the seat forming faces adapted to engage sides of the center members opposite to the sides thereof engaged by said seat faces, and wing nuts on said screws acting on said clamp members to urge them into center member clamping position.

ROBERT H. FAY.

REFERENCES CITED

The following references are of record in the file of this patent:

UNITED STATES PATENTS

| Number | Name | Date |
|---|---|---|
| 578,676 | Murphy | Mar. 9, 1897 |